Oct. 5, 1937.  J. ROBINSON  2,094,672
AUTOMATIC TRAIN PIPE CONNECTER
Filed Nov. 3, 1934

Joseph Robinson
INVENTOR.
BY Robert Cobb
ATTORNEYS.

Patented Oct. 5, 1937

2,094,672

UNITED STATES PATENT OFFICE 2,094,672

AUTOMATIC TRAIN PIPE CONNECTER

Joseph Robinson, New York, N. Y., assignor of one-half to Roy M. Wolvin

Application November 3, 1934, Serial No. 751,369

5 Claims. (Cl. 285—58)

This application is a continuation in part of my copending application filed December 16, 1930, Serial #502,761, which has matured into Patent No. 1,981,004, granted November 20, 1934, for improvements in Automatic train pipe couplings, and relates to gasket renewing means for such automatic couplings. Among the advantages of the construction is that it produces a rugged powerful locking means by which the gasket carrying conduit may be mounted directly in the coupling head and gradually released to bleed the air from the train pipe hose when extracting the conduit under air pressure. The construction provides against accidental loss of the lock pin, and against sticking or fouling in operation.

In the drawing Figure 1 is a sectional plan view of my improvement;

Figure 1:
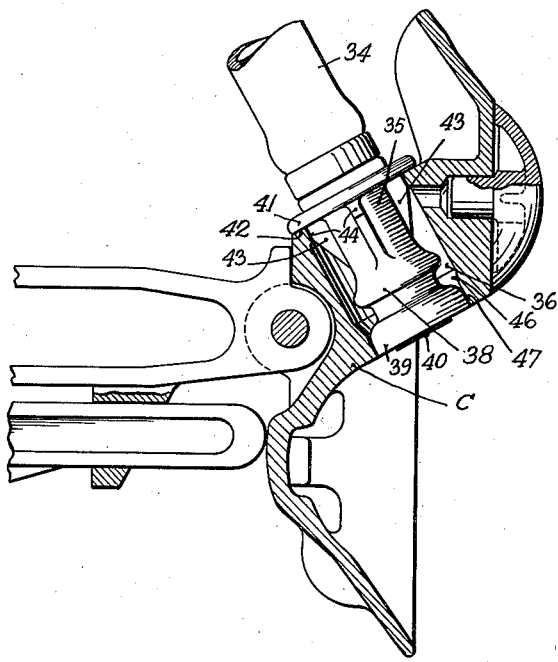
Figure 2:
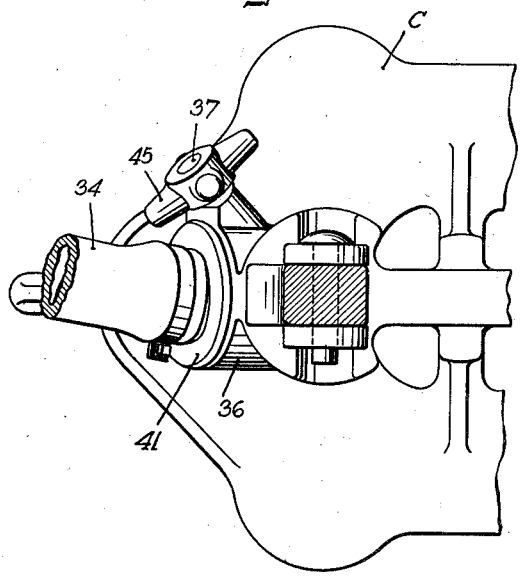
Figure 2 is a rear elevation of the construction shown in Figure 1.
Figure 3:
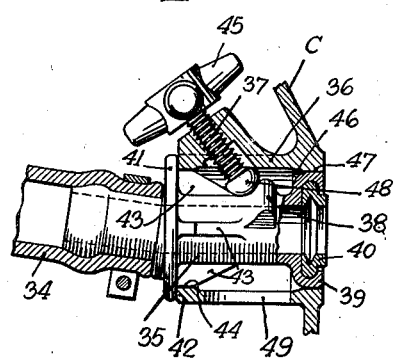
Figure 3 is a sectional detail through the housing 36 and the forward end of the conduit 35 showing the parts of my improvement in the service position.

It will be understood that my improved gasket renewing means may be used with any type of automatic connecter, and that any method may be employed for flexibly supporting the coupling head C from the car coupler. A suitable support is shown in the patent granted on my aforesaid co-pending application.

Any suitable means may be employed to attach the usual train pipe hose 34 to the coupling head C. I preferably accomplish this by providing the hose with a suitable gasket carrying conduit 35 which I pass through the coupling head at an angle to the longitudinal direction of the connecter, and removably lock the conduit in the chamber or housing 36 by a rugged plunger pin 37 threaded through a wall of the chamber into engagement with a semi-annular shoulder 38 on the conduit. The front face 39 of the conduit carries a suitable gasket 40, preferably of the expansible type, and is disposed in substantially the plane of the coupling face of the head C, a stop 41 engaging a seat 42 on the chamber 36 to assure this positioning. A plurality of laterally extending webs or guides 43 position the rear portion of the conduit laterally in the housing, these webs being provided with seats or shoulders 44 to form an adequate bearing or support for, and to resist lateral strains on, the rear end of the conduit 35. The plunger or lock pin 37 is provided with a winged nut 45 or other suitable means for rotating the pin into and out of engagement with the shoulder 38. At the forward end of the chamber or housing a flared surface 46 is provided to guide the front end of the conduit 35 into its seat 47 adjacent the face of the coupling head C as the plunger pin 38 is threaded forward. This operation brings the stop 41 against the rear face 42 of the chamber and properly positions the conduit therein.

When it is desired to remove the gasket 40 from between the faces of mated connecter heads having my improvement, the lock pin 37 is threaded rearwardly until its head 48 is withdrawn sufficiently to permit extraction of the conduit 35. During this operation the conduit gradually moves rearwardly bleeding the air in the hose 34. This removes all danger to the operator in extracting the conduit. It will be noted that the plunger or lock pin 37 is assembled into the chamber 36 from within the latter, the wing nut 45 being thereafter applied, and that by reason of its enlarged head or end 48 the pin cannot be extracted from its threaded bearing while the conduit is in the chamber. This arrangement prevents the pin being backed entirely out of the housing and lost. At its lower side the housing is provided with an opening 49 to free it from any foreign substance that may gain entrance thereto.

My improvement may, of course, be used to removably lock in place a conduit which extends through the coupling head on an axis substantially parallel to, instead of obliquely to, the longitudinal axis of the connecter.

What I claim is:

1. An automatic train pipe coupling comprising in combination, a coupling head having a chamber therein, means for supporting the head from a car, a gasket associated with said head, and gasket renewing means including a hollow conduit mounted in said chamber and carrying at its front end the gasket disposed in approximately the plane of the coupling face of said head, a seat on said conduit, a lock pin disposed at an angle to the longitudinal axis of said conduit and gradually movable into and out of engagement with said seat through a wall of said head to shift the conduit along said chamber, and means for guiding the conduit into position in said chamber, said means including laterally projecting ribs on said conduit, said ribs progressively projecting greater distances from said conduit along the conduit from front to rear, and said ribs affording bearing surfaces adjacent their rear ends preventing relative lateral movement of said conduit in said chamber.

2. An automatic train pipe coupling comprising in combination, a coupling head having a chamber therein, means for supporting the head from a car, a gasket associated with said head, and gasket renewing means including, a hollow conduit mounted in said chamber and carrying at its front end the gasket disposed in approximately the plane of the coupling face of said head, a seat on said conduit, a lock pin disposed at an angle to the longitudinal axis of said conduit and gradually movable into and out of engagement with said seat through a wall of said head to shift the conduit along said chamber and retard its rearward movement when removing the conduit under air pressure, means for positioning said conduit in said chamber and for resisting lateral movement of the conduit, and means for preventing extraction of said lock pin from its bearing while said conduit is in said chamber.

3. An automatic train pipe coupling comprising in combination, a coupling head having a chamber therein, means for supporting the head from a car, a gasket associated with said head, and gasket renewing means including, a hollow conduit mounted in said chamber and carrying at its front end the gasket disposed in approximately the plane of the coupling face of said head, a semi-annular seat on said conduit at the rear of said gasket, a radially extending lug on said conduit adapted to engage said chamber to position the conduit therein and to resist lateral strains on said conduit, a stop for limiting the forward movement of the conduit in said chamber, a lock pin threaded through a wall of said chamber at an angle to the longitudinal center line of the latter, said pin having an enlarged forward end adapted to engage said seat and to prevent extraction of the pin from said chamber while said conduit is in the chamber, and means for rotating said lock pin.

4. An automatic train pipe coupling comprising in combination, a coupling head having a chamber therein, means for supporting the head from a car, a gasket associated with said head, and gasket renewing means including a hollow conduit mounted in said chamber and carrying at its front end the gasket disposed in approximately the plane of the coupling face of said head, a seat on said conduit, a lock pin disposed at an angle to the longitudinal axis of said conduit and gradually movable into and out of engagement with said seat through a wall of said head to shift the conduit along said chamber and retard its rearward movement in removing the conduit under air pressure, and means for limiting the forward movement of said conduit in the chamber, said last mentioned means comprising an annular abutment shoulder projecting laterally at the rear end of said conduit and adapted to abut the rear face of said coupling head about the rear end of the chamber.

5. An automatic train pipe coupling comprising in combination, a coupling head having a chamber therein, means for supporting the head from a car, a gasket associated with said head, and gasket renewing means including a hollow conduit mounted in said chamber and carrying at its front end the gasket disposed in approximately the plane of the coupling face of the head, the body of said conduit being smaller in size than the chamber, forming an annular space around the conduit, a lock pin for exerting longitudinal and lateral force components on said conduit, means on said conduit and coacting with said lock pin for preventing lateral and longitudinal movement of the conduit respecting the chamber when the said conduit is in position with the gasket disposed in approximately the plane of the coupling head as aforesaid, and said coupling head having an opening therethrough communicating with the chamber at one side thereof and affording an outlet for any foreign substance which may gain entrance to the chamber.

JOSEPH ROBINSON.